(12) United States Patent
    Baier et al.

(10) Patent No.: US 9,537,768 B2
(45) Date of Patent: Jan. 3, 2017

(54) SYSTEM THAT PROVIDES FOR REMOVAL OF MIDDLEWARE IN AN INDUSTRIAL AUTOMATION ENVIRONMENT

(71) Applicant: Rockwell Automation Technologies, Inc., Mayfield Heights, OH (US)

(72) Inventors: John J. Baier, Mentor, OH (US); David W. Farchmin, Grafton, WI (US); Michael D. Kalan, Highland Heights, OH (US); Randall A. Marquardt, Waukesha, WI (US); Richard A. Morse, Hudson, OH (US); Stephen C. Briant, Moon Township, PA (US); Sujeet Chand, Brookfield, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 269 days.

(21) Appl. No.: 14/289,526

(22) Filed: May 28, 2014

(65) Prior Publication Data
    US 2014/0280520 A1    Sep. 18, 2014

Related U.S. Application Data

(63) Continuation of application No. 10/955,985, filed on Sep. 30, 2004, now abandoned.

(51) Int. Cl.
    | | |
    |---|---|
    | *G06F 15/16* | (2006.01) |
    | *H04L 12/741* | (2013.01) |
    | *H04L 29/08* | (2006.01) |
    | *H04L 29/06* | (2006.01) |
    | *H04L 29/12* | (2006.01) |

(52) U.S. Cl.
    CPC ............. *H04L 45/745* (2013.01); *H04L 67/02* (2013.01); *H04L 67/025* (2013.01); *H04L 67/125* (2013.01); *H04L 69/08* (2013.01); *H04L 61/15* (2013.01)

(58) Field of Classification Search
    None
    See application file for complete search history.

(56) References Cited

U.S. PATENT DOCUMENTS

| | | | |
|---|---|---|---|
| 5,282,127 A | 1/1994 | Mii | |
| 6,201,996 B1 | 3/2001 | Crater et al. | |
| 6,266,713 B1 * | 7/2001 | Karanam | G05B 19/042 710/9 |
| 6,282,454 B1 | 8/2001 | Papadopoulos et al. | |
| 6,317,426 B1 | 11/2001 | Afanador et al. | |

(Continued)

OTHER PUBLICATIONS

Jurgen Jasperneite, Switched Ethernet for Factory Communication, 2001.

(Continued)

*Primary Examiner* — Scott B Christensen
(74) *Attorney, Agent, or Firm* — Amin, Turocy & Watson, LLP

(57) ABSTRACT

An industrial automation environment communication system comprises a component that receives a web-based request in an industrial automation environment, wherein the web-based request includes data relating to an automation device. An encapsulating component encapsulates the web-based request, wherein the encapsulation facilitates transmitting the data to the automation device via an industrial automation network protocol.

20 Claims, 13 Drawing Sheets

(56) References Cited

U.S. PATENT DOCUMENTS

| | | | |
|---|---|---|---|
| 6,484,061 B2 | 11/2002 | Papadopoulos et al. | |
| 6,587,884 B1 | 7/2003 | Papadopoulos et al. | |
| 6,640,140 B1* | 10/2003 | Lindner | G05B 19/0421 |
| | | | 700/18 |
| 6,732,191 B1 | 5/2004 | Baker et al. | |
| 6,801,948 B2 | 10/2004 | Clark et al. | |
| 6,920,502 B2 | 7/2005 | Araujo et al. | |
| 6,978,294 B1* | 12/2005 | Adams | H04L 67/34 |
| | | | 709/217 |
| 6,986,036 B2 | 1/2006 | Wang et al. | |
| 7,003,304 B1 | 2/2006 | Helferich | |
| 7,117,239 B1* | 10/2006 | Hansen | G06F 11/0748 |
| | | | 709/200 |
| 7,149,797 B1 | 12/2006 | Weller et al. | |
| 7,260,841 B2 | 8/2007 | Tenereillo | |
| 7,328,078 B2 | 2/2008 | Sanford et al. | |
| 7,512,756 B2 | 3/2009 | Malkin | |
| 7,761,555 B1* | 7/2010 | Bishel | H04L 12/2814 |
| | | | 340/12.39 |
| 2002/0010801 A1* | 1/2002 | Meagher | H04L 41/0226 |
| | | | 709/251 |
| 2002/0016926 A1 | 2/2002 | Nguyen et al. | |
| 2002/0099814 A1* | 7/2002 | Mastrianni | H04L 29/12009 |
| | | | 709/224 |
| 2002/0120763 A1* | 8/2002 | Miloushev | G06F 17/30197 |
| | | | 709/230 |
| 2002/0129281 A1 | 9/2002 | Hatfalvi et al. | |
| 2002/0174178 A1* | 11/2002 | Stawikowski | H04L 29/06 |
| | | | 709/203 |
| 2003/0051026 A1 | 3/2003 | Carter et al. | |
| 2003/0061274 A1 | 3/2003 | Lo | |
| 2003/0225693 A1 | 12/2003 | Ballard et al. | |
| 2004/0098483 A1 | 5/2004 | Engel | |
| 2004/0111512 A1 | 6/2004 | Barth | |
| 2005/0007249 A1 | 1/2005 | Eryurek et al. | |
| 2005/0071282 A1 | 3/2005 | Lu et al. | |
| 2005/0102407 A1 | 5/2005 | Clapper | |
| 2005/0256964 A1* | 11/2005 | Dube | H04L 67/02 |
| | | | 709/230 |
| 2006/0117295 A1* | 6/2006 | Wu | G05B 19/00 |
| | | | 717/104 |

OTHER PUBLICATIONS

Office Action dated May 27, 2008 for U.S. Appl. No. 10/955,985, 35 pages.

Office Action dated Dec. 18, 2008 for U.S. Appl. No. 10/955,985, 21 pages.

Office Action dated Jun. 17, 2009 for U.S. Appl. No. 10/955,985, 25 pages.

Office Action dated Feb. 3, 2010 for U.S. Appl. No. 10/955,985, 23 pages.

Office Action dated Feb. 4, 2011 for U.S. Appl. No. 10/955,985, 30 pages.

Office Action dated Jul. 8, 2011 for U.S. Appl. No. 10/955,985, 28 pages.

Office Action dated Jan. 28, 2014 for U.S. Appl. No. 10/955,985, 22 pages.

* cited by examiner

SYSTEM THAT PROVIDES FOR REMOVAL OF MIDDLEWARE IN AN INDUSTRIAL AUTOMATION ENVIRONMENT

CROSS-REFERENCE TO RELATED APPLICATIONS

This application is a continuation of, and claims priority to, U.S. patent application Ser. No. 10/955,985, filed on Sep. 30, 2004, and entitled "A SYSTEM THAT PROVIDES FOR REMOVAL OF MIDDLEWARE IN AN INDUSTRIAL AUTOMATION ENVIRONMENT," the entirety of which is incorporated herein by reference.

TECHNICAL FIELD

The subject invention relates generally to industrial system automation, and more particularly to utilizing automation devices as servers in an industrial automation environment

BACKGROUND OF THE INVENTION

Industrial control systems have enabled modern factories to become partially or completely automated in many circumstances. These systems generally include a plurality of Input and Output (I/O) modules that interface at a device level to switches, contactors, relays and solenoids along with analog control to provide more complex functions such as Proportional, Integral and Derivative (PID) control. Communications have also been integrated within the systems, whereby many industrial controllers can communicate via network technologies such as Ethernet, ControlNet, DeviceNet or other network protocols and also communicate to higher level computing systems. Generally, industrial controllers utilize the aforementioned technologies along with other technology to control, cooperate and communicate across multiple and diverse applications.

Industrial controllers and associated control systems have increasingly become more sophisticated and complicated as control applications have been distributed across the plant floor and in many cases across geographical or physical boundaries. As an example, multiple controllers and/or other devices can communicate and cooperate to control one or more aspects of an overall manufacturing process via a network, whereas other devices can be remotely located, yet still contribute to the same process. In other words, control applications have become less centrally located on a singular control system having associated responsibilities for an entire operation. Thus, distribution of an overall control function and/or process frequently occurs across many control components, systems or devices.

Advances in networking technologies have further facilitated automating in manufacturing in an industrial environment. For example, utilization of the Internet has allowed indirect communication between high-level systems, such as Enterprise Resource Planning systems, and factory floor devices (e.g., programmable logic controllers) across substantial geographic boundaries. The communication is indirect because in conventional systems middleware is required to map data and data records that are employed by applications within the ERP system(s). Accordingly, if the middleware is compromised, an entire automation system can be subject to failure. Attempting to eliminate the middleware, however, is also problematic. For instance, if the middleware is removed, then controllers and other low-level devices require a greater amount of intelligence, and must be able to recognize and generate data structures that can be recognized and generated by the high-level system. Further, eliminating middleware can compromise control logic, data records, and data structures that are associated with automation controllers and other low-level devices.

These devices and data associated therewith can be compromised due to communication protocols that are employed in connection with conventional data exchange. In particular, conventional industrial automation systems employ server computers as middleware to receive requests over the Internet, and requests and data responding to such requests are communicated over the HyperText Transfer Protocol (HTTP). Web servers facilitate sending and receipt of such requests, and the requests are serviced by server computers. Particularly, the server computers (which act as middleware) pull data from the automation controllers and map such data to the higher-level systems, thus enabling the high level systems to recognize and manipulate the data. By employing HTTP as a communication protocol, the server computers are subject to attacks that are common to the Internet, but the automation controllers are insulated from such attacks by the server computers. Eliminating the server computers while retaining use of conventional communication methods would subject automation controllers to Internet-based attacks, thus compromising products being manufactured as well as safety of workers within an industrial environment. For instance, a malicious user skilled in computer programming may be able to obtain access directly to an automation controller if the server computers do not buffer such controller. Such access can be obtained because the conventional Internet data exchange protocol is HTTP.

Accordingly, there exists a need in the art for a system and/or methodology for protecting automation controllers and other low-level automation devices if middleware that maps data between the automation controllers/low-level automation devices and high-level systems is removed.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention facilitates removal of middleware in an industrial automation environment. In particular, the subject invention contemplates utilizing industrial automation devices that can generate and recognize data structures that are substantially similar to data structures that can be generated and recognized by high-level systems. Often, however, the high-level systems may desire to communicate with industrial automation devices over large geographical boundaries, and thus may desirably communicate over the Internet. Many industrial automation devices cannot communicate over general Internet protocols, such as HTTP—therefore, the subject invention provides a mechanism for packaging of web-based data transmissions to enable transmission of the web-based request over an industrial automation protocol. This mechanism provides a plurality of benefits, including removal of the industrial automation devices from the scope of the Internet.

The subject invention provides an encapsulating component that receives a web-based request via the Internet over an Internet-based protocol, such as HTTP. The web-based request can include, for example an XML web service, a SOAP request, a HTML request, and the like. The encapsulating component can receive such data and facilitate packaging of the data to enable transmission of the data over an industrial automation protocol, such as a control and information protocol (CIP). In accordance with one aspect of the subject invention, a conventional web server can comprise the encapsulating component. Thus, the web-based request can be communicated conventionally from a high-level system to the web server, and the encapsulating component can expose data within the web-based request in a conventional manner (e.g., the web server can act as a client). Thereafter, the industrial automation device can act as a server, and can receive this data without exposing such devices to the Internet.

In accordance with another aspect of the subject invention, a plurality of the automation devices can act as server farm, therefore enabling distribution of computing tasks relating to a manufacturing process. For instance, processing can be distributed over a plurality of industrial automation devices, thereby increasing throughput and improving efficiency relating to a manufacturing process. Furthermore, memory can be allocated between a plurality of industrial automation devices. For example, if one industrial automation device is at capacity while another has substantial capacity, at least a portion of data within the industrial automation that is at capacity can be transferred to the industrial automation device that has substantial capacity.

In accordance with yet another aspect of the subject invention, timing mechanisms can be associated with industrial automation devices that act in conjunction as a server farm. For instance, each industrial automation device can include a timing mechanism that generates timestamps relating to data that is generated and/or obtained by the industrial automation controller. More particularly, for each data structure generated and/or obtained by the industrial automation devices, timestamps can be created and associated with the data structures. These data structures can be retained in temporary storage within the industrial automation devices. A monitoring component can determine when the industrial automation devices are near capacity, and a server (e.g., a conventional web server) can be employed to pull the data and the associated timestamp, and direct such data to a data store designed for more permanent storage. Thereafter, the data structures can be organized sequentially by analyzing the timestamps associated therewith.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the subject invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
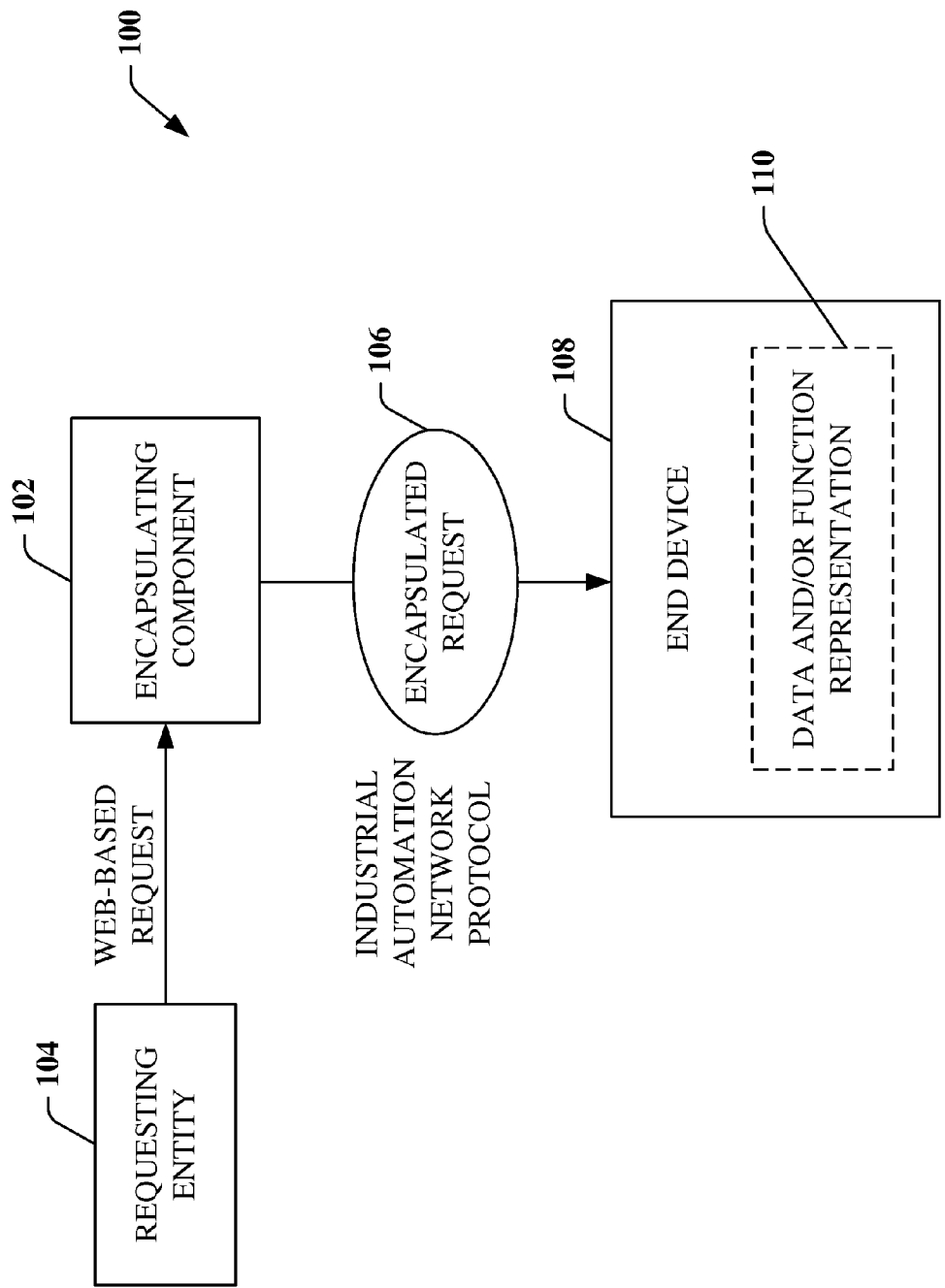
FIG. 1 is a high-level block diagram of a system that facilitates removal of middleware in an industrial automation system in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Referring now to the drawings, FIG. 1 illustrates a high-level system overview in connection with one particular aspect of the subject invention. The subject invention relates to a novel system 100 that facilitates removal of middleware in an industrial automation environment. The system 100 includes an encapsulating component 102 that receives a web-based request from a requesting entity 104. For example, the web-based request can be a collection of an XML Web Service, a Simple Object Access Protocol (SOAP) request, and an HTML request. An XML Web service, as is known in the art, is a collection of protocols and standards employed in connection with exchanging data between applications. Thus, software applications written in disparate programming languages and running on differing platforms can utilize web services in connection with exchanging data over a computer network (e.g., the Internet). Such interoperability is enabled through employment of open standards and protocols. For instance, via utilizing HTTP, web services can work through many common firewall security measures without requiring alterations to filtering rules. While web services is one particular exemplary tool that can be employed in connection with data exchange, it is to be understood that other suitable communication approaches, such as RMI, CORPA, and DCOM are also contemplated by the present invention and intended to fall under the scope of the hereto-appended claims. SOAP is a light-weight protocol (based upon XML) for exchanging messages between computer software. SOAP is an extensible and decentralized framework that can operate over multiple computer network protocol stacks. Remote procedure calls can be modeled as an interaction of several SOAP messages. Furthermore, SOAP is an enabling protocol for web services, and can run in connection with all Internet Protocols (HTTP is most common). An HTML request relates to employing HTML in connection with creating a web page. HTML typically appears in text files stored on computers that are connected to the Internet. Such files include instructions for a program relating to a manner in which the text is to be displayed. While HTML is an exemplary language, such example is not meant to limit the scope of the present invention, as any suitable markup language can be employed by the present invention in connection with the web-based request.

The encapsulating component 102 encapsulates entities and/or requests (e.g., web services, SOAP, HTML) of the web-based request, and enables an encapsulated request 106 to be relayed to an end device 108 over an industrial automation network protocol (in contrast to HTTP). Thereafter, the encapsulated request 106 can be driven directly into the end device 108, thereby enabling the end device 108 to include a data and/or function representation without requiring utilization of middleware. For example, the encapsulating component 102 can be included within a web server. Such implementation is in contrast to conventional system implementation, where a plurality of server computers are often required to receive the web-based request and analyze such request. Thereafter, several operations are typically necessary to enable the end device 108 to receive and recognize data. Thus, the system 100 facilitates elimination such server computers that are utilized in conventional systems.

The encapsulated request 106 is delivered to the end device 108 via an industrial automation network protocol to facilitate security maintenance of the end device 108 as well as other similar end devices. In particular, if the encapsulated request 106 were delivered over HTTP, the end device 108 would be subject to viruses, worms, and other malicious attacks that are common to the Internet. In conventional systems, the middleware servers are subject to such attacks, but end devices (e.g., programmable logic controllers) are insulated from such attacks by the server computers. In the system 100, as middleware is not existent, the encapsulating component 102 or other suitable entity can facilitate prohibition of common Internet attacks with respect to the end device 108. Thus, the encapsulated request 106 can be delivered over the industrial automation network protocol to ensure that the end device 108 is not subject to attacks that could exist if such encapsulated request 106 were delivered via HTTP to the end device 108.

In accordance with one aspect of the subject invention, the requesting entity 104 can be related to a high-level system, such as an Enterprise Resource Planning (ERP) system. Thus, the requesting entity 104 can generate the web-based request in order to deliver data to the end device 108 relating to manufacturing (e.g., control commands and/or information). The requesting entity 104 that generates the web-based request can be initiated by a user and/or automatically initiated by an intelligent component within a high-level system. As stated above, the encapsulating component 102 can be included within a web server, wherein such web server receives the web-based request and alters protocols employed in connection with relaying the web-based request. In accordance with another aspect of the subject invention, the end device 108 can be a programmable logic controller (PLC). PLCs are small computers that are employed for automating real-world processes (e.g., controlling machinery within an industrial environment). Typically, PLCs are microprocessor-based devices with modular or integral input/output circuitry, wherein such circuitry is utilized to monitor status of field connected sensor inputs, and is further utilized to control output actuators according to a logic program. While PLCs can be utilized within the system 100 as the end device 108, it is to be understood that any suitable end device that includes sufficient intelligence to receive the encapsulated request 106 can be employed in connection with the subject invention. For example, any suitable microprocessor and/or microcontroller can be utilized within the system 100 as the end device 108.

In accordance with yet another aspect of the subject invention, the industrial automation network protocol can be a control and information protocol (CIP). CIP is a proprietary protocol employed by various companies that specialize in automation of systems and/or processes within a manufacturing environment. Conventionally, fieldbus protocols (Profibus, Interbus-S, FIP, P-Net, AS-i) have been isolated implementations of certain ideas and functionalities that were thought best suited to solve a particular problem or complete a certain task. Accordingly, quite effective fieldbuses exist that effectuate communications between particular devices/systems well, but that are suitable only for certain layers within an industrial automation environment and/or are associated with limited functionality. Typically, utilization of these fieldbuses can result in creation of "barriers" within an industrial automation architecture, wherein such "barriers" are difficult to penetrate and require complex bridging devices. Such bridging still typically cannot bridge a gap between various systems that can be quite different in nature. CIP was developed to offer a scalable mechanism that allows a uniform protocol to be employed between high-level systems (ERP) and low-level devices (e.g., the end device 108) without placing a substantial burden on the end device 108. Thus, if data is desirably delivered between a high-level system and an end device, where such delivery is not communicated over the Internet, then utilizing the CIP protocol is desirable. Given expanding automation, however, it is often imperative to deliver data over large geographical boundaries via the Internet. Thus, the encapsulating component 102 transforms the web-based request into the encapsulated request 106 which can be recognized by the end device 108 while insulating such end device 108 from Internet-based attacks.

Figure 2:
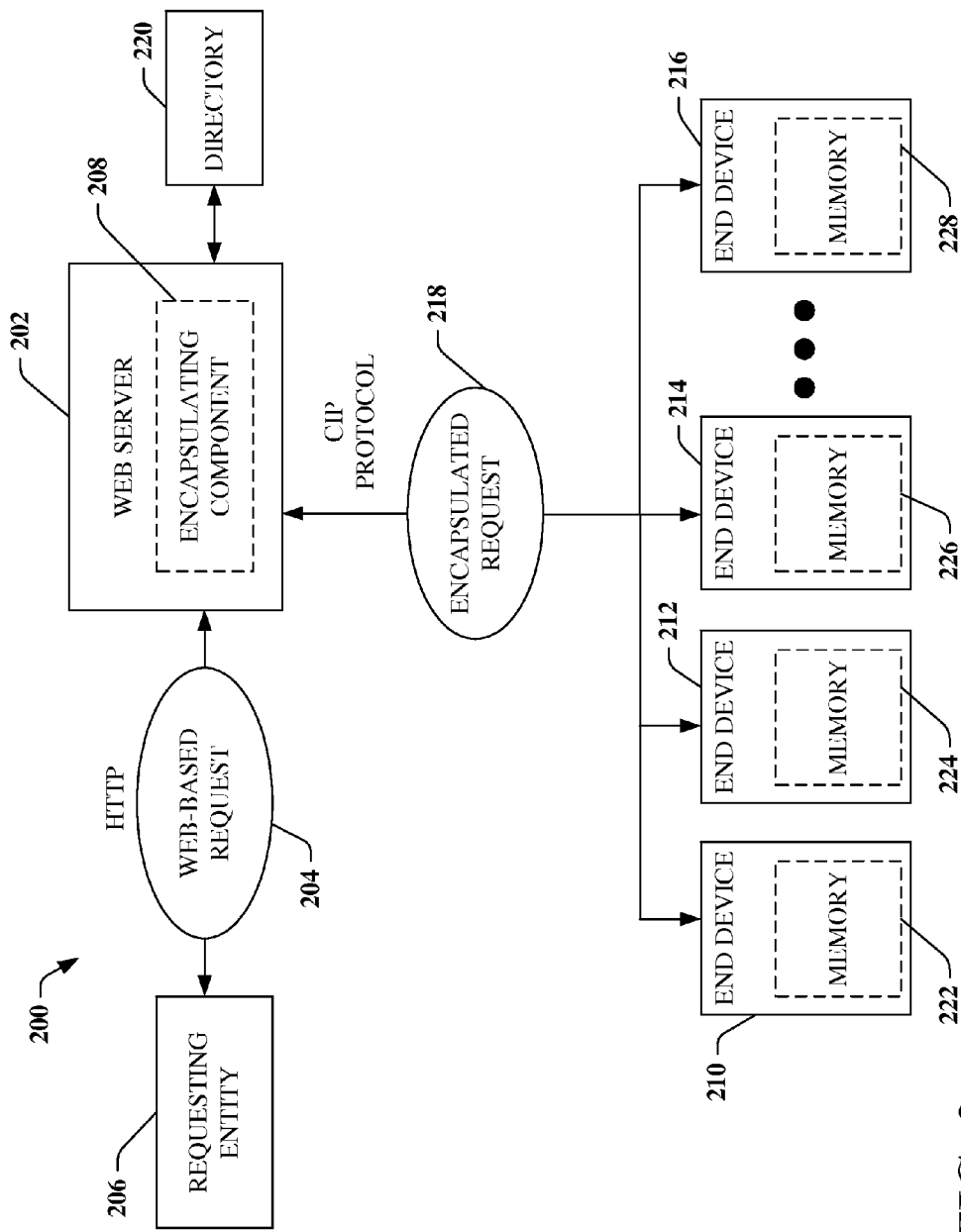
FIG. 2 is a block diagram of a system that facilitates configuring a plurality of industrial automation devices to act as a server farm in accordance with an aspect of the subject invention.

Turning now to FIG. 2, a system 200 that facilitates removal of middleware (both hardware and software) from an industrial automation environment is illustrated. The system 200 includes a web server 202 that receives a web-based request via HTTP. HTTP is a protocol that is utilized to communicate information over the Internet, and is a request/response protocol between clients and servers. The web-based request 204 is initiated by a requesting entity 206, wherein the requesting entity 206 can be related to a high-level system such as an ERP system. The web server 202 includes an encapsulating component 208 that encapsulates data within the web-based request 204 in XML. Such encapsulation by the encapsulating component 208 enables data within the web-based request 204 to be driven directly into one or more end devices 210-216. The web server 202 effectively operates as a proxy, wherein the web server 202 receives the web-based request 204 and employs the encapsulating component 208 to generate an encapsulated request 218. The web server 202 can be labeled as a client, while the collection of end devices 210-216 operate as individual servers within a server farm.

The end devices 210-216 can be organized within a directory 220 (e.g., the directory 220 can include a namespace for underlying device data and methods relating to each of the end devices 210-216). If the requesting entity 206 generates the web-based request 204 that relates to a particular end device, the web server 202 and the encapsulating component 208 can query the directory 220 to determine which end device that data should be entered into and/or pulled from. For instance, the requesting entity 206 may desire to enter data into the end device 210. The requesting entity 204 can generate the web-based request 204 indicating that data is desirably entered into the end device 210 and deliver such request to the web server 202. The web server 202 can review contents of the directory 220 to determine where in a system the end device 210 is located and underlying data and methods associated with the end device 210. The web server 202 and the encapsulating component 208 can then deliver the encapsulated request 218 (containing data to be entered) to the end device 210. Each of the end devices 210-216 is associated with memory 222-228, wherein such memory 222-228 is typically temporary storage (e.g., memory associated with a PLC). Thus, data can be delivered from the requesting entity 206 to the end devices 210-216 without requiring middleware, and such data can be stored in memory 222-228. Similarly, data relating to a manufacturing environment can be stored within the memory 222-228 and pulled by the web server 202 upon a request from the requesting entity 206. The encapsulating component 208 can then package the data to enable deliver of the data over the Internet to the requesting entity 206 (e.g., via HTTP).

In accordance with one aspect of the subject invention, the encapsulating component 208 can utilize XML to package data within the encapsulated request 218. XML is employed for creating special-purpose markup languages, and is capable of describing many different types of data. XML is appropriate for data transfer, as it facilitates compatibility of a system with web and Internet protocols, and is simultaneously in machine-readable format as well as human-readable format. Furthermore, XML can be self-documenting, wherein data structures and field names within an XML document can be described and include field names. After the encapsulating component 208 encapsulates the web-based request 204, the encapsulated request 218 can be transferred over a CIP protocol, thereby insulating the end devices 210-216 from Internet attacks and the like.

Figure 3:
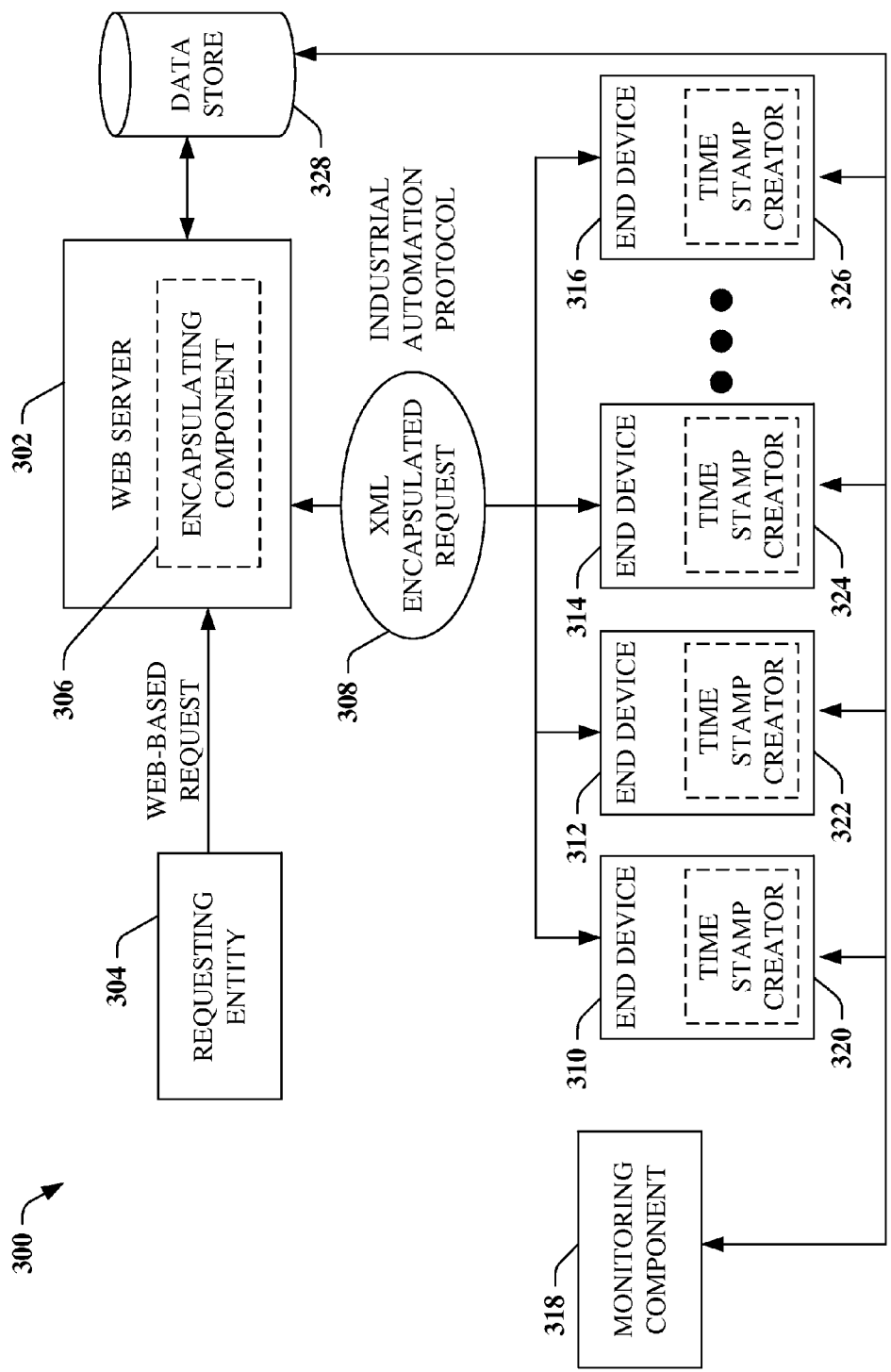
FIG. 3 is a block diagram of a system that facilitates automatic sequential organization of data structures generated/obtained by industrial automation devices in accordance with an aspect of the subject invention.

Turning now to FIG. 3, a system 300 that facilitates removal of middleware from an industrial automation system is illustrated. The system 300 includes a web server 302 that receives a web-based request from a requesting entity 304. For example, the web-based request can be one or a combination of an XML web service, a SOAP request, a HTML request, and the like. In accordance with one aspect of the subject invention, the web-based request is sent over the Internet via HTTP. The web server 302 can include an encapsulating component 306 that packages the web-based request in XML, thereby creating an XML encapsulated request 308. The XML encapsulated request 308 is modified by the encapsulating component 306 to enable such request 308 to be delivered to one or more end devices 310-316 over an industrial automation network protocol (e.g., CIP). As the system 300 operates without server computers, the end devices 310-316 effectively operate as a server farm. Such end devices 310-316, however, should be protected from Internet-based attacks. Accordingly, the web-based request is packaged utilizing a disparate communications protocol than that employed in conventional Internet communications (thus insulating such end devices 310-316 from Internet attacks).

The system 300 further includes a monitoring component 318 that monitors activity of the end devices 310-316 as well as capabilities and current usage of such end devices 310-316. Thus, the monitoring component 318 can ascertain current processing usage and capabilities of each of the end devices 310-316, available memory relating to each of the end devices 310-316, and the like. The end devices 310-316 can be associated with time stamp creators 322-326 that associate time with data structures obtained/generated by the end devices 310-316. For example, the end devices 310-316 can be PLCs that monitor status of sensors and actuators and generate control commands based upon such monitoring. Further, the end devices 310-316 can operate conjunctively to control a particular manufacturing process. Thus, it can be important to determine a sequence of data generation/obtainment in order to ascertain efficiency and operability of control programs utilized by the end devices 310-316. Therefore, the time stamp creators 320-326 can generate timestamps associated with data structures that are temporarily stored in memory of the end devices 310-316. The monitoring component 318 can determine that one or more of memories (not shown) of the end devices 310-316 is at or near capacity, and cause such data structures and associated timestamps to be stored in a data store 328. The data store 328 can be utilized for more permanent storage than that which can be provided by the end devices 310-316.

In accordance with one aspect of the subject invention, the monitoring component 318 can direct the end devices 310-316 to deliver data structures (and associated timestamps) to the data store 328. For instance, the data store 328 can be on a factory floor. The data structures can be sequenced by monitoring the timestamps generated by the time stamp creators 320-326 and associated with the data structures stored within the data store 328. Accordingly, the data store 328 is not required to receive data in any particular order, but rather can receive data in any order and thereafter order such data based at least in part upon associated timestamps generated by the time stamp creators 320-326. In accordance with a disparate aspect of the subject invention, the requesting entity 304 and/or another high-level system can desirably receive data obtained and/or generated by the end devices 310-316. Thus, the data store 328 can be directly accessible by the web server 302, which can thereafter facilitate transfer of data between the data store 328 and the requesting entity 304. Accordingly, the monitoring component 318 can ascertain whether memory within the end devices 310-316 is at or near capacity, and can inform the web server 302 that the end devices 310-316 contain data and are nearing capacity. Thereafter, the web server 302 (or other suitable server) can pull the data from the one or more end devices 310-316 that are at or near capacity, and direct such data to the data store 328. As data is received from the end devices 310-316, such data can be organized based at least in part upon sequence via analyzing timestamps generated by the time stamp creators 320-326 and associated with data structures. Thus, the monitoring component 318 can be communicatively connected both to the end devices 310-316 and to the web server 306 or other suitable server. Furthermore, it is to be understood that data from all end devices 310-316 is not required to be obtained simultaneously. Rather, for example, data from an individual end device (e.g., the end device 310) can be pulled upon sensing that memory associated with such individual end device is at or near capacity. At a later time, data from a disparate individual end device can be pulled upon ascertaining that such end device is at or near capacity. The system 300 thus provides a flexible mechanism for obtaining and assorting data without need of middleware server computers and/or software.

In accordance with another aspect of the subject invention, data temporarily stored within the end devices 310-316 can be delivered from the end devices 310-316 to the web server 302 over a protocol that is native to such end devices 310. For instance, the end devices 310-316 can communicate over an industrial automation protocol (e.g., CIP) to each other (as well as other devices). If the data is desirably relayed from the data store 328 to the requesting entity 304, then the encapsulating component 306 can ensure that the data is packaged appropriately for Internet communications. For example, the end devices 310 can generate XML data structures that are received by the web server 302 over CIP. Thereafter, the web server 302 can be employed to facilitate storing the XML data structures in a data store 328, where they can be organized according to timestamp. Upon receiving a request for such data, the web server 302 can ensure that such data can be transmitted over an appropriate protocol (e.g., HTTP) to the requesting entity 304 (e.g., a high-level system such as an ERP system).

Figure 4:
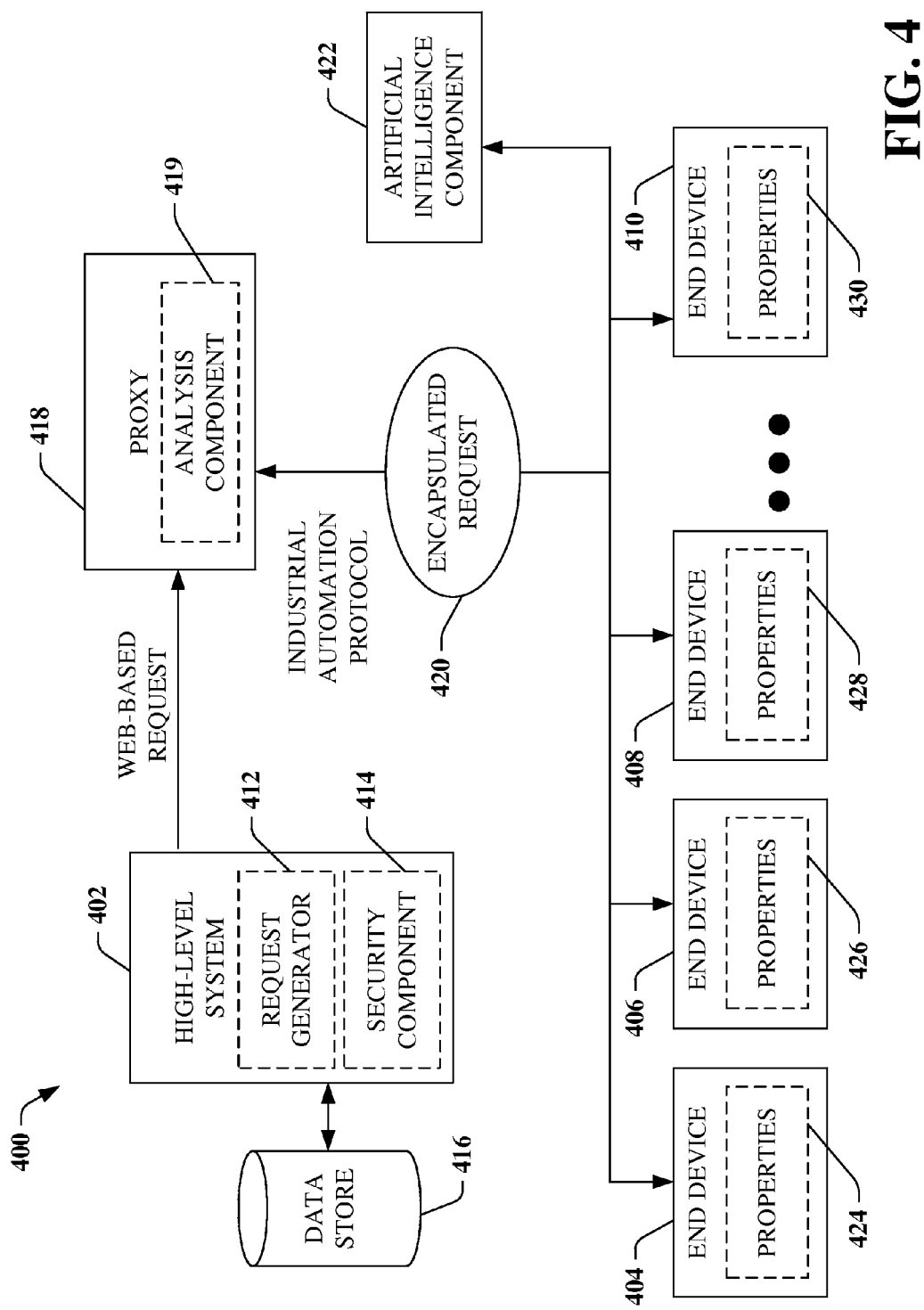
FIG. 4 is a block diagram of a system that facilitates removal of middleware in an industrial automation system in accordance with an aspect of the subject invention.

Turning now to FIG. 4, a system 400 that facilitates removal of middleware from an industrial automation environment is illustrated. The system 400 includes a high-level system 402 that generates a web-based request relating to one or more end devices 404-410. For example, the high-level system 402 can be an enterprise resource planning (ERP) system. ERPs are management information systems that integrate and automate several business practices associated with operations or production aspects of a company, such as manufacturing, distribution, logistics, inventory, shipping, invoicing, and accounting. The high-level system 402 includes a request generator 412 that creates a web-based request. For example, the request generator 412 can generate the web-based request upon occurrence of a pre-defined event or condition, periodically, randomly and/or pseudo-randomly, user-initiated, automatically, or any other suitable manner for generating the web-based request. The web-based request itself can be any suitable request that is initiated by a client, which can include XML web services, SOAP requests, HTML requests, and the like.

The high-level system 402 can further include a security component 414 that monitors and maintains integrity of the high-level system 402 and data exchanges associated therewith. For example, prior to communicating the web-based request, the security component 414 can determine whether such request is initiated by a trusted source. More particularly, if a user initiates the web-based request, the security component 414 can require user authentication information from the user, such as username, password, personal identification number (PIN), biometric indicia such as fingerprints, voice samples, and the like, etc. The security component 414 can compare the proffered authentication information with authentication information and data relating to user rights and privileges that exist within a data store 416. Thus, if the user is not privileged to generate the web-based request, the security component 414 will prevent such user from communicating the web-based request. This provides a layer of security for the end devices 404-410, which receive control commands from the high-level system 402. Further, it protects sensitive data that exists within the end devices 410 that can be requested by the high-level system 402.

The security component 414 can also be employed to utilize conventional security mechanisms in connection with transmitting the web-based request. For example, the web-based request can include sensitive proprietary control logic that is to be employed by one or more of the end devices 404-410. Thus, it is desirable that contents of the web-based request not be compromised. Accordingly, the security component 414 can be employed to encrypt the web-based request to protect such request while in transmission over a network (e.g., the Internet). For instance, the security component 414 can commission the web-based request with keys that are known only to a receiving end device. The security component 414 can further include data that is utilized to determine whether the web-based request has been subject to tampering. The web-based request is received by a proxy 418 that is employed to encapsulate such web-based request and package it in a manner that insulates the end devices 404-410 from the Internet. For example, the proxy 418 can receive the web-based request, which is transported over HTTP, and modify such request so that it can be communicated to one or more of the end devices 404-410 over an industrial automation protocol, such as CIP. The proxy 418 can, for instance, be a conventional web server that includes an encapsulation component (not shown) that transforms the web-based request into an encapsulated request 420 (e.g., suitable for transmission via CIP). The proxy 418 can include an analysis component 419 that analyzes the web-based request and determines whether such request has been compromised. For instance, the analysis component 419 can determine whether the web-based request has been subject to tampering. In accordance with a disparate aspect of the subject invention, the analysis component can have knowledge of keys within the web-based request, and decrypt such request prior to it being encapsulated and delivered to the end devices 404-410.

The collection of end devices 404-410 can operate in a distributed computing environment. For example, if the end device 404 and the end device 406 are utilizing ninety percent of their processing capabilities while the end device 408 is only utilizing forty percent of its processing capabilities, tasks can be redistributed amongst such end devices 404-408 to facilitate improved efficiency and throughput (e.g., tasks can be distributed amongst the end devices 404-408 so they are each operating at sixty five percent of their processing capabilities). The system 400 can further include an artificial intelligence component 422 that makes inferences relating to operation of the system 400. As used herein, the terms to "infer" or "inference" refer generally to the process of reasoning about or inferring states of a system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

For example, the artificial intelligence component 422 can monitor properties 424-430 associated with the end devices 404-410 and make inferences relating to distribution of tasks. In particular, the artificial intelligence component 422 can watch the system 400 and learn how the end devices 404-410 are typically utilized over a period of time, and thereafter assist in computing and/or memory distribution between the end devices 404-410. For instance, a series of actions in a sequence undertaken by the end device 404 can be typically associated with rapid filling of memory of the end device 404. Thus, the artificial intelligence component can watch for such sequence and allocate memory upon determining that such sequence is about to begin. Similarly, the artificial intelligence component 422 can learn that web-based requests with particular characteristics require frequent pulling of data from memory of the end devices 404-410. Therefore, the artificial intelligence component 422 can inform the proxy 418 that the memory of the end devices 404-410 should be emptied in preparation for a substantial amount of data that will likely follow the web-based request. The artificial intelligence component 422 can employ a cost/benefit analysis in connection with making inferences, weighing benefits of inferring correctly against costs of inferring incorrectly.

Figure 5:
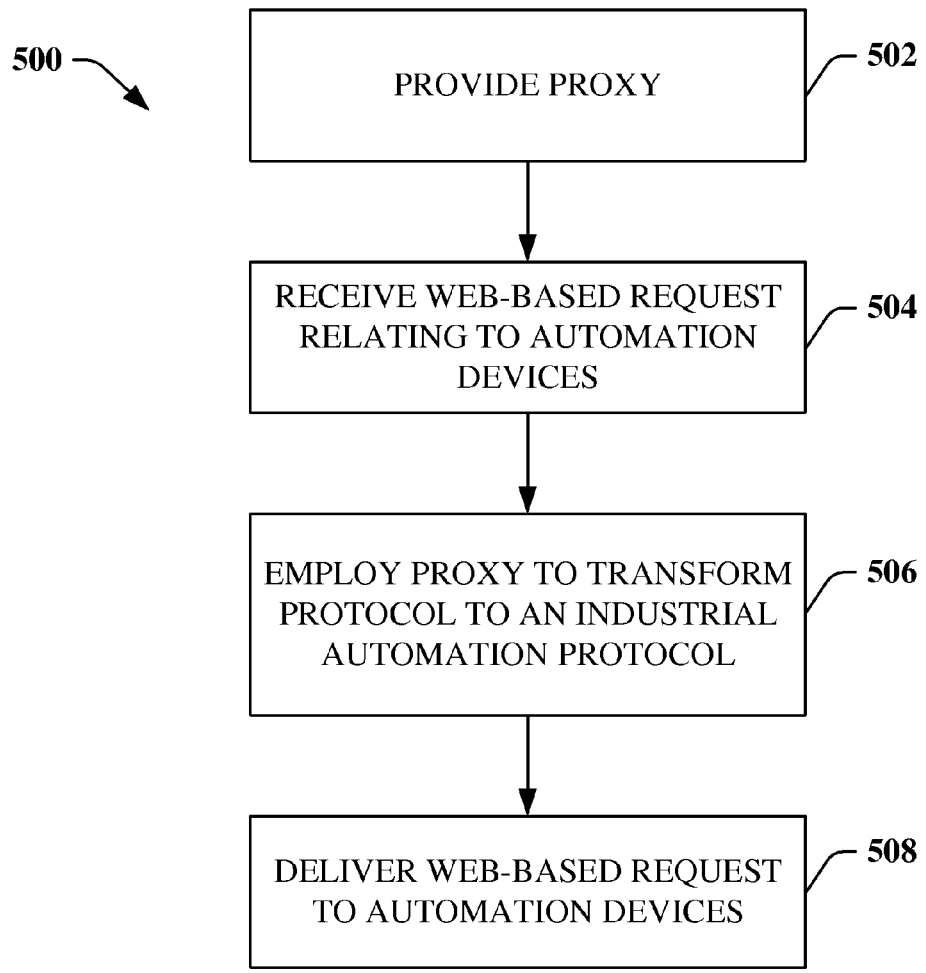
FIG. 5 is a representative flow diagram illustrating a methodology for insulating industrial automation devices from the Internet accordance with an aspect of the subject invention.

Turning now to FIG. 5, a methodology 500 for mitigating a need for middleware in an industrial automation system is illustrated. While, for purposes of simplicity of explanation, the methodology 500 is shown and described as a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

At 502, a proxy is provided, wherein the proxy is utilized to insulate end devices, such as PLCs, from the Internet or other public network. For example, the proxy can be a conventional web server. At 504, a web-based request relating to automation devices (e.g., factory floor devices) is received by the proxy. The web-based request can include data that is desirably driven into the automation device(s). For example, the data can be control logic, data employed to configure one or more automation device(s), a request for data that is stored in the automation device(s), or any other suitable web-based request. In accordance with one aspect of the subject invention, the web-based request can be transmitted to the proxy over HTTP, and can include XML web services, one or more SOAP requests, one or more HTML requests, and other transmission-enabling components and read-enabling components.

At 506, the proxy is employed to transform the web-based request, which is commissioned over a public network (e.g., HTTP), to a web-based request that can be transmitted over an industrial automation protocol (e.g., CIP). For example, the industrial automation protocol can be a protocol that the automation devices natively employ to communicate with one another as well as to communicate to high-level systems. Furthermore, the proxy can be employed to ensure that data within the web-based request is structured in a manner that can be recognized and produced by the automation device(s). For instance, data within the web-based request can be packaged in XML. At 508, the web-based request is delivered over the industrial automation protocol to one or more automation device(s). Configuring automation devices to communicate over a private protocol (e.g., a proprietary protocol such as CIP) effectively insulates such automation devices from the Internet, and consequently from attacks that are common to the Internet.

The automation device(s) can be employed to function in a manner substantially similar to server computers. This is because in conventional automation systems/methodologies, raw data is retrieved by server computers, which is then transformed to a data structure that is recognized by a higher-level system. Server computers also generate mapping between automation devices and high-level systems. The automation devices of the subject invention can recognize and generate data structures that can also be recognized by high-level systems. Accordingly, the server computers can be removed from an automation system. The server computers, however, also are employed to insulate automation devices (e.g., PLCs) from the Internet, as such computers are required to receive the data and manipulate it utilizing mapping and data structure software. The methodology 500 provides this insulation through altering a transmission protocol prior to delivering a web-based request and data therein to an automation device.

Figure 6:
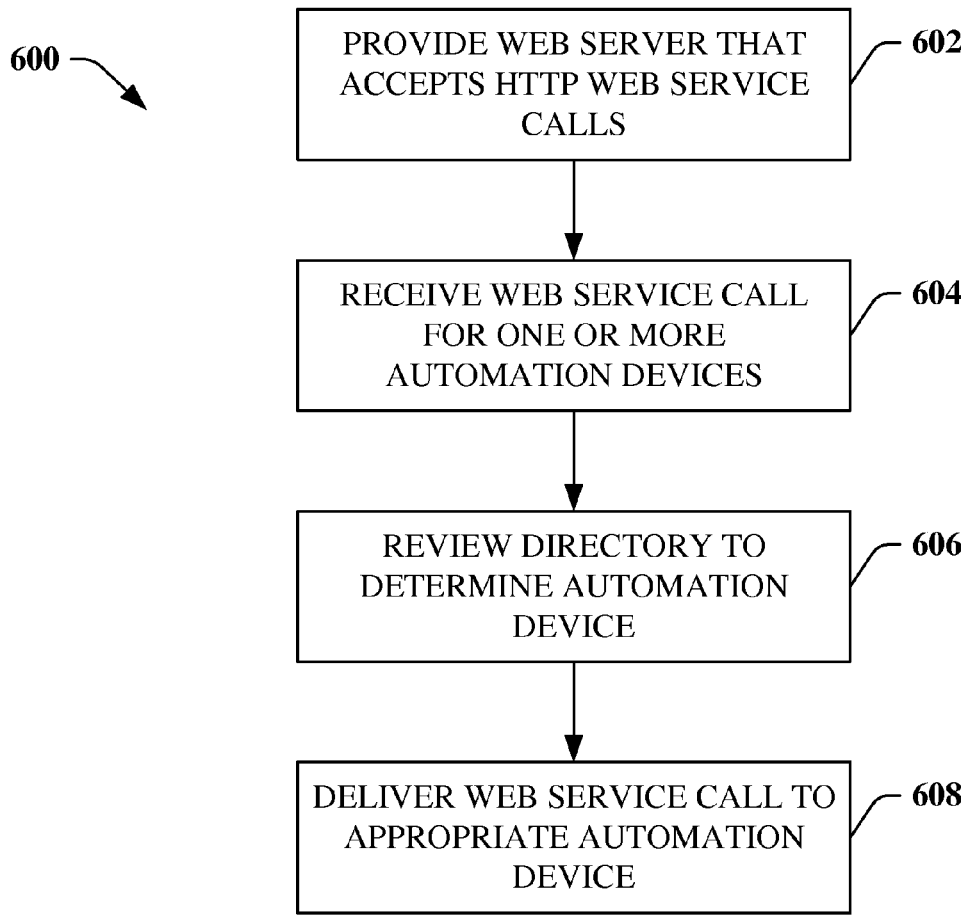
FIG. 6 is a representative flow diagram illustrating a methodology for locating an industrial automation device by employing a directory in accordance with an aspect of the subject invention.

Now turning to FIG. 6, a methodology 600 for directing a web service call to an automation device is illustrated. At 602, a web server is provided, wherein the web server accepts HTTP web service calls. For instance, the web service calls can also be associated with SOAP requests and HTML requests. At 604, a web service call relating to one or more automation devices is received by the web server. For example, a plurality of industrial automation devices can be existent upon a factory floor, and it may be desirable to direct the web service call to a subset of such automation devices. Accordingly, the web server should be able to locate particular automation devices given a web service call.

At 606, a directory is reviewed by the web server to determine automation device(s) towards which the web service call should be directed. In accordance with one aspect of the subject invention, the directory can effectively be a look-up service for factory floor information. Particularly, the directory facilitates interaction between the web server (e.g., a client) and one or more automation devices (e.g., where the automation devices are employed as servers). Thus, the web server effectively acts as a single client to a plurality of disparate automation devices, as such automation devices are not directly connected to the Internet. The web server can utilize the directory to review data and functions that are related to particular automation devices as well as provide namespace to automation devices on at least a portion of a factory floor. At 608, the web service call is delivered to the appropriate automation device. For example, based upon information located in the directory, the web server can package and deliver the web service call to an appropriate automation device. In accordance with one aspect of the subject invention, the web server can expose data in the web service call to particular automation devices, and the automation devices can retrieve such web service over a protocol native to such automation devices (e.g., CIP).

Figure 7:
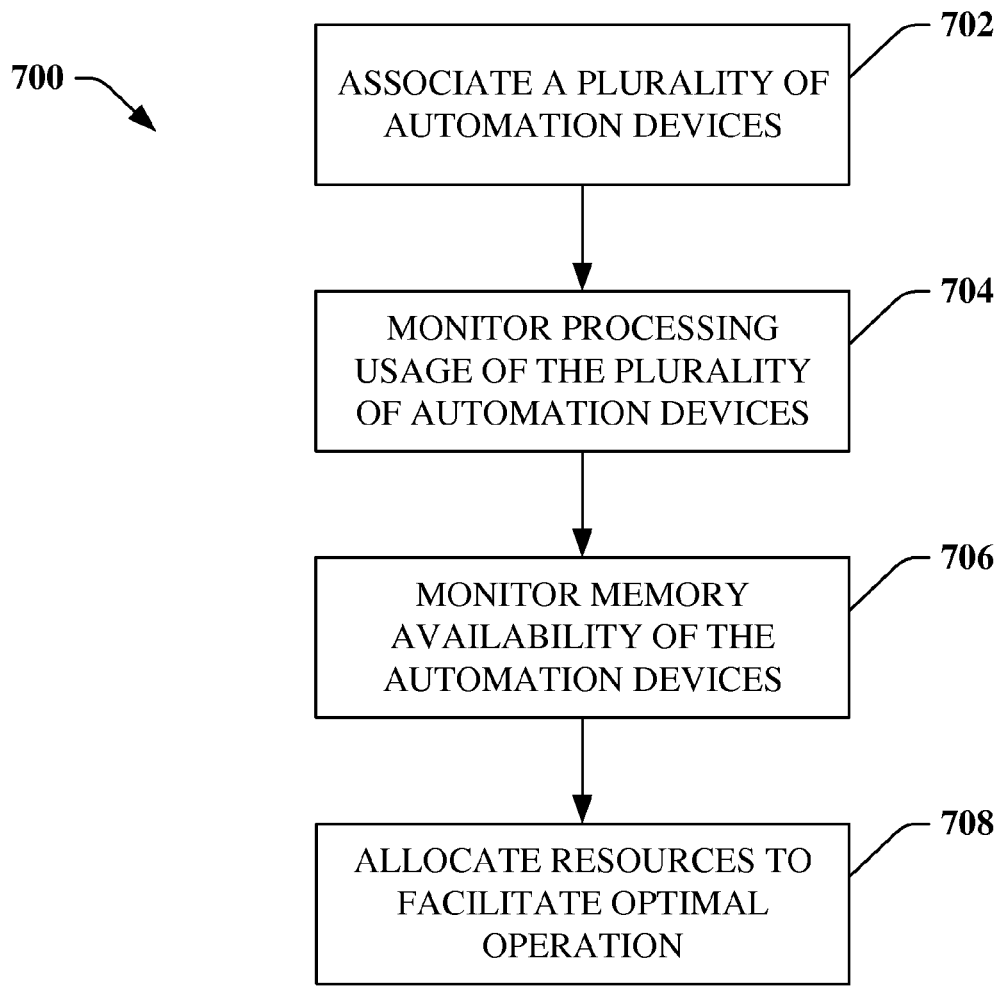
FIG. 7 is a representative flow diagram illustrating a methodology for configuring a plurality of industrial automation devices to act as a distributed computing environment in accordance with an aspect of the subject invention.

Now referring to FIG. 7, a methodology 700 for managing a plurality of automation devices as a server farm is illustrated. At 702, a plurality of automation devices are associated with one another. For instance, the automation devices can be communicatively connected via any suitable network. In accordance with an aspect of the subject invention, at least a subset of the automation devices can be PLCs, which include memory and processing capabilities. At 704, processing usage and capabilities of the plurality of automation devices are monitored. For instance, a monitoring component can be employed to monitor usage of the automation devices. In a disparate embodiment, the automation devices can be self-monitoring, and can communicate to one another their current processing usage periodically, randomly, upon reaching a defined level of usage, or the like. Similarly, alarms can be generated upon an automation device reaching a particular level of processing capacity.

At 706, available memory of the automation devices is monitored. Such monitoring can occur in a manner substantially similar to that described above with respect to monitoring processing. At 708, resources are allocated to facilitate optimal operation. For instance, two automation devices can operate at ninety percent processing capacity while a disparate connected automation device operates at twenty percent processing capacity. Such processing usage can be monitored, and thereafter tasks can be distributed over a network to the disparate automation device to facilitate optimal operation of the automation devices. For instance, utilizing the association of automation devices as a server farm can increase throughput in a manufacturing environment as well as improve efficiency, as automation devices will not be overloaded with tasks and/or data.

Figure 8:
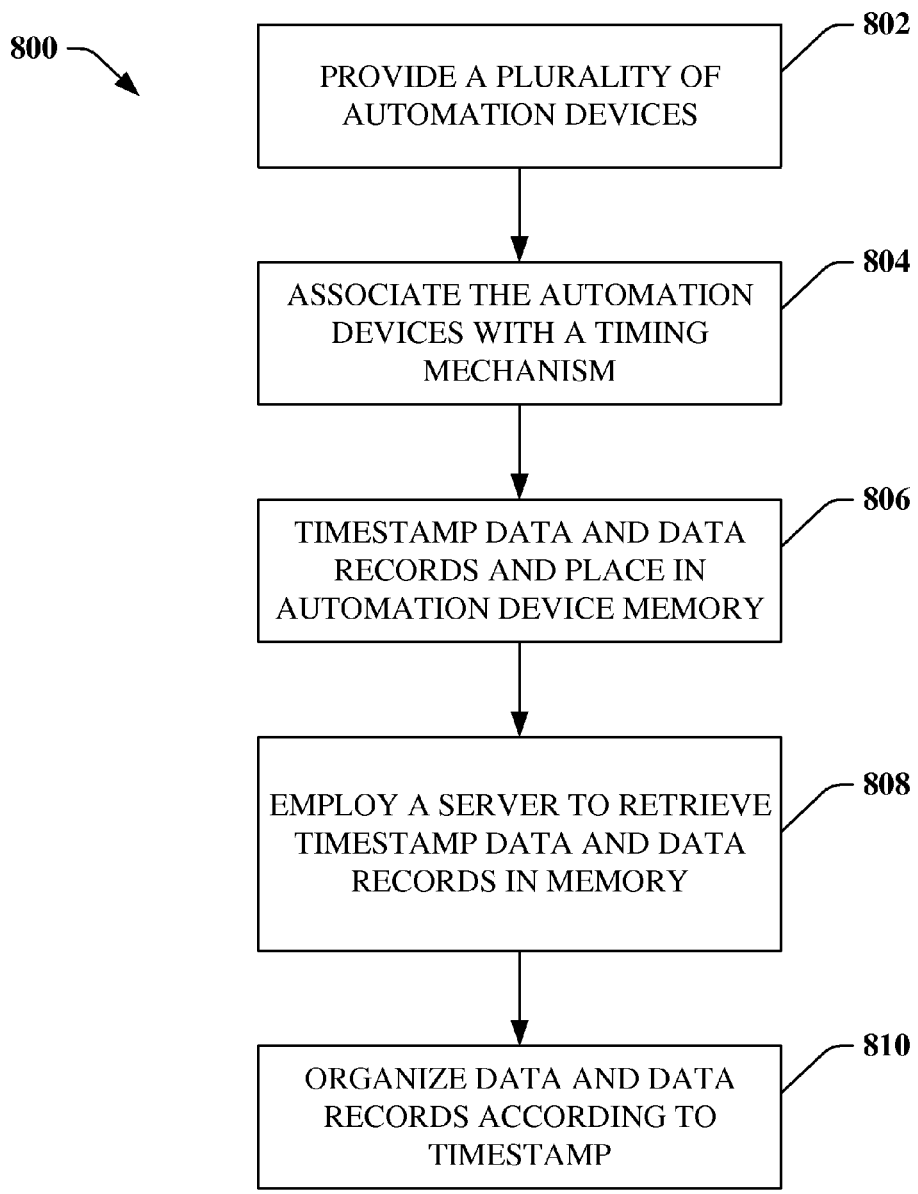
FIG. 8 is a representative flow diagram illustrating a methodology for generating timestamps relating to data structures in accordance with an aspect of the present invention.

Referring now to FIG. 8, a methodology 800 for organizing data obtained from a plurality of automation devices is illustrated. At 802, a plurality of automation devices are provided. For example, the automation devices can be PLCs or other suitable controllers that include capabilities to control at least a portion of a manufacturing process. At 804, the automation devices are associated with a timing mechanism. For instance, each of the automation devices can include a clocking mechanism that is substantially synchronized with clocking mechanisms of other related automation devices. Particularly, an automation device in one geographic region can be synchronized with an automation device in a disparate geographic region. In accordance with an aspect of the subject invention, the clocking mechanism can be synchronized utilizing Coordinated Universal Time (UTC). Utilization of this time standard can be beneficial due to its independence with respect to geographic zones (e.g., time zones around the world are simply offsets from UTC). Any suitable timing standard and method/system for synchronizing clocking mechanisms of automation devices, however, is contemplated by the subject invention and intended to fall under the scope of the hereto-appended claims.

At 806, data obtained and/or generated by the automation devices is associated with a timestamp, and such data and associated timestamp are placed within memory related to the automation devices. For instance, the automation devices can include internal memory that temporarily stores the data and associated timestamp(s). Furthermore, the amount of memory associated with the automation devices can be monitored by a monitoring component, which can be within the automation devices or external thereto. At 808 a web server or other suitable server is employed to retrieve timestamp data and data records in memory related to the automation devices. For example, the monitoring component can inform the server that memory associated with one or more automation devices is nearing capacity. Thereafter, the server can retrieve data records and associated timestamps from the memory and store such data records and timestamps in a more permanent location. Such retrieval of data enables the memory of the automation device to be cleared. At 810, data records are organized within the permanent memory according to associated timestamp(s). In an industrial automation environment, timing and monitoring of timing are imperative to an efficient and safe working environment. Thus, monitoring data sequentially is extremely important. In conventional systems, as automation devices only generate raw data, server computers are required to obtain data in a certain sequence. The subject invention does not require that a server collect data records in a particular sequence, but rather can collect data records according to memory availability in industrial automation devices. The data records can be organized thereafter by positioning such data in a sequential arrangement according to the timestamp.

Figure 9:
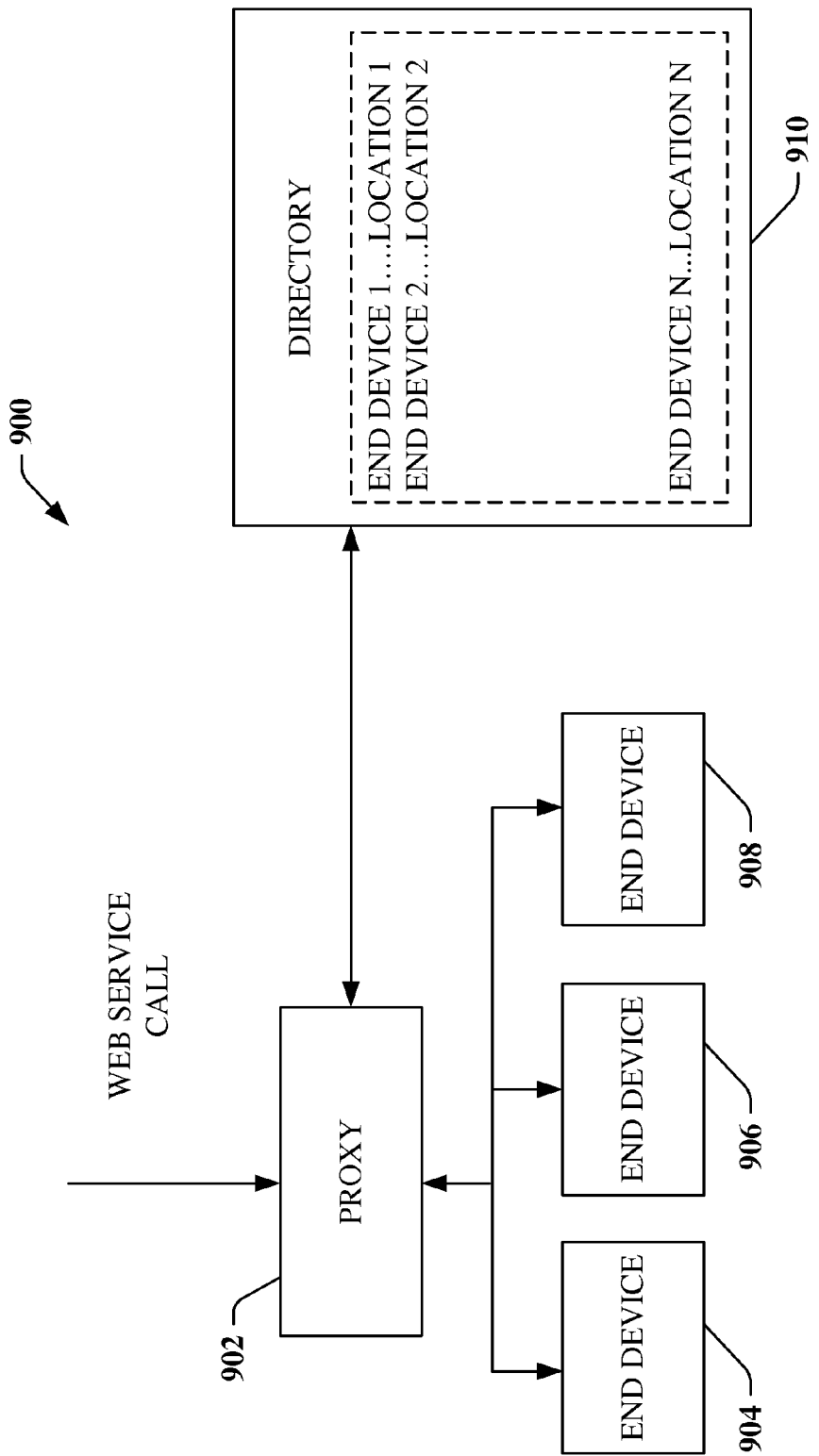
FIG. 9 is an exemplary industrial automation system that utilizes a directory to locate an industrial automation device in accordance with an aspect of the subject invention.

Now turning to FIG. 9, an exemplary system 900 that facilitates location of an end device in which to deliver a web service call is illustrated. The system 900 includes a proxy 902 that receives a web service call. The proxy 902 acts as a client to a plurality of end devices 904-908, which act as individual servers. To determine where to transmit the web service call, the proxy 902 utilizes a directory 910. The directory 910 includes a list of devices as well as location of such devices (e.g., port numbers, IP addresses, . . . ) within an industrial automation environment. In particular, the directory can provide a namespace as well as data and functions that are associated with the end devices 904-908. Upon determining a location of a device that is to receive the web service call, the proxy can deliver such web service call to the appropriate end device and/or make the web service call available to the appropriate end device. The proxy 902 can further alter a protocol over which the web service call is to be sent. For instance, the web service call can be delivered over HTTP to the proxy 902, and thereafter repackaged to facilitate delivery of the web service call to one or more of the end devices 904-908 over an industrial automation protocol (e.g., CIP). This enables the end devices 904-908 to act as servers without subject the devices 904-908 to Internet attacks.

Figure 10:
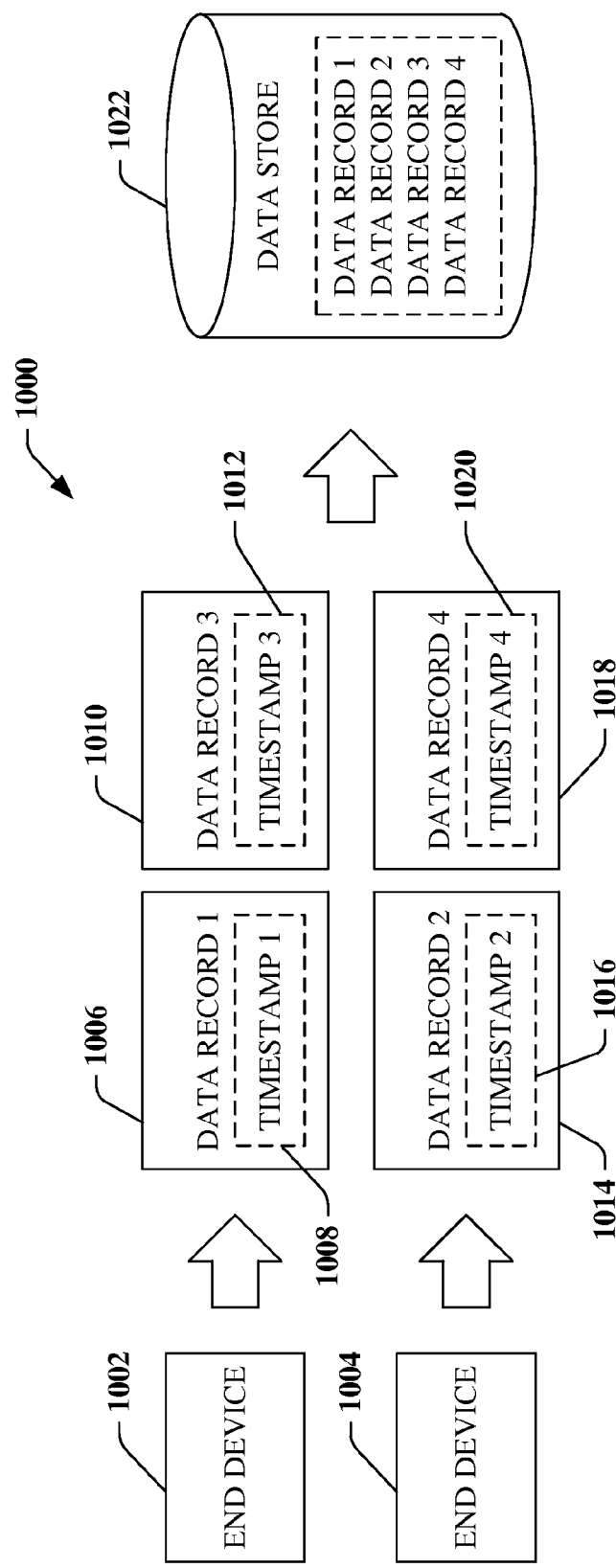
FIG. 10 is an illustration of data organization by employing timestamps in accordance with an aspect of the subject invention.

Referring now to FIG. 10, an exemplary implementation 1000 showing how data records can be organized in accordance with the present invention is illustrated. A pair of end devices 1002 and 1004 are operating in an industrial automation environment, and generate and/or obtain data records that are associated with timestamps. In particular, the end device 1002 outputs a first data record that is associated with a first timestamp 1008. Such first timestamp 1008 illustrates that the first data record 1006 was generated and/or obtained prior to other data records. The end device 1002 further has generated a third data record 1010 that is associated with a third timestamp 1012. The end device 1004 has generated a second data record 1014 that is associated with a second timestamp 1016, as well as a fourth data record 1018 that is associated with a fourth timestamp 1020.

To organize the data records sequentially, the first data record 1006 was generated/obtained first in time, the second data record 1014 was generated/obtained second in time, the third data record 1010 was generated third in time, and the fourth data record 1018 was generated last in time. Conventional systems require that data be obtained sequentially—thus, the first data record 1006 must be collected first in time from the end device 1002, followed by the second data record 1014 from end device 1004, and so forth. Utilizing the subject invention, data records can be temporarily stored in the end devices 1002 and 1004, and such data can be pulled at any suitable time and in any suitable order. As the data records 1006, 1010, 1014, and 1018 are associated with the timestamps 1008, 1012, 1016, and 1020, respectively, they can be organized sequentially at any suitable time, provided that the end devices 1002 and 1004 are synchronized. Thus, the data records 1006, 1010, 1014, and 1018 can be stored in a data store 1022 and organized according to the timestamps 1008, 1012, 1016, and 1020 associated therewith.

Figure 11:
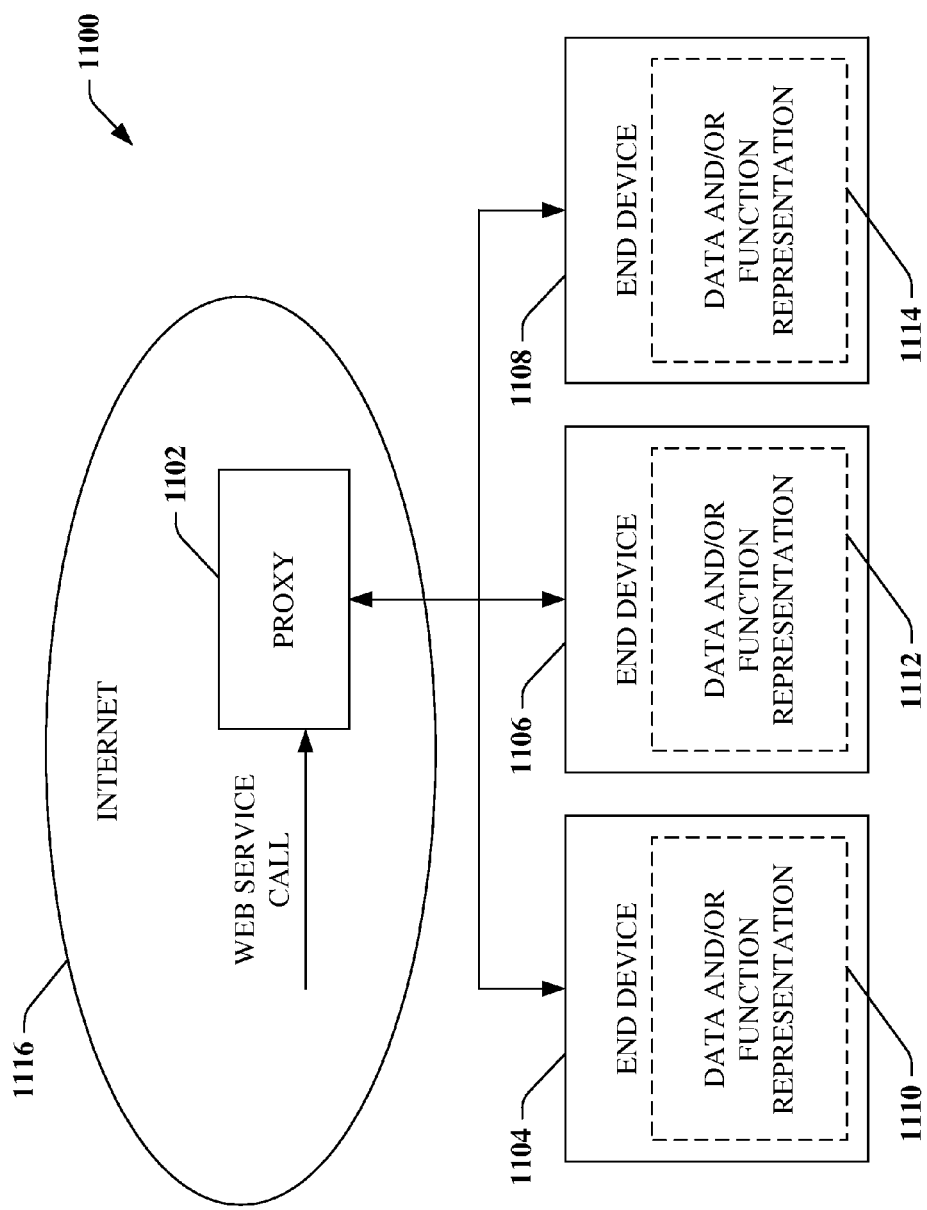
FIG. 11 is an exemplary implementation of a system that facilitates insulating industrial automation devices from the Internet in accordance with an aspect of the subject invention.

Turning now to FIG. 11, an exemplary system 1100 in accordance with an aspect of the subject invention is illustrated. The system 1100 includes a proxy 1102 that receives a web service call. For example, the proxy 1102 can be a web server, which acts as a single client to a plurality of end devices 1104-1108. The end devices 1104-1108 can be configured to include data and/or function representations 1110-1114, which can be communicated directly to a high-level system without requirement of middleware. The proxy 1102 receives a web service call, wherein such web service call includes data that is desirably delivered to one or more of the end devices 1104-1108. As the proxy 1102 is a conventional web server that receives conventional web service calls, such proxy 1102 is within reach of the Internet 1116 as well as attacks common thereto. Further, data within the proxy 1102 is accessible over the Internet.

The end devices 1104-1108 and the data and/or function representations 1110-1114 therein are not subject to the Internet, as they do not communicate over HTTP or other public communication protocol. Rather, the end devices 1104-1108 communicate via an industrial automation protocol that is not suitable for Internet communications (e.g., CIP). Accordingly, the proxy 1102 packages the web service call to a form that is recognizable by the end devices 1104-1110. Thus, while the proxy 1102 is within the reach of the Internet 1116, the end devices 1104-1108 lie outside the Internet 1116 as shown.

Figure 12:
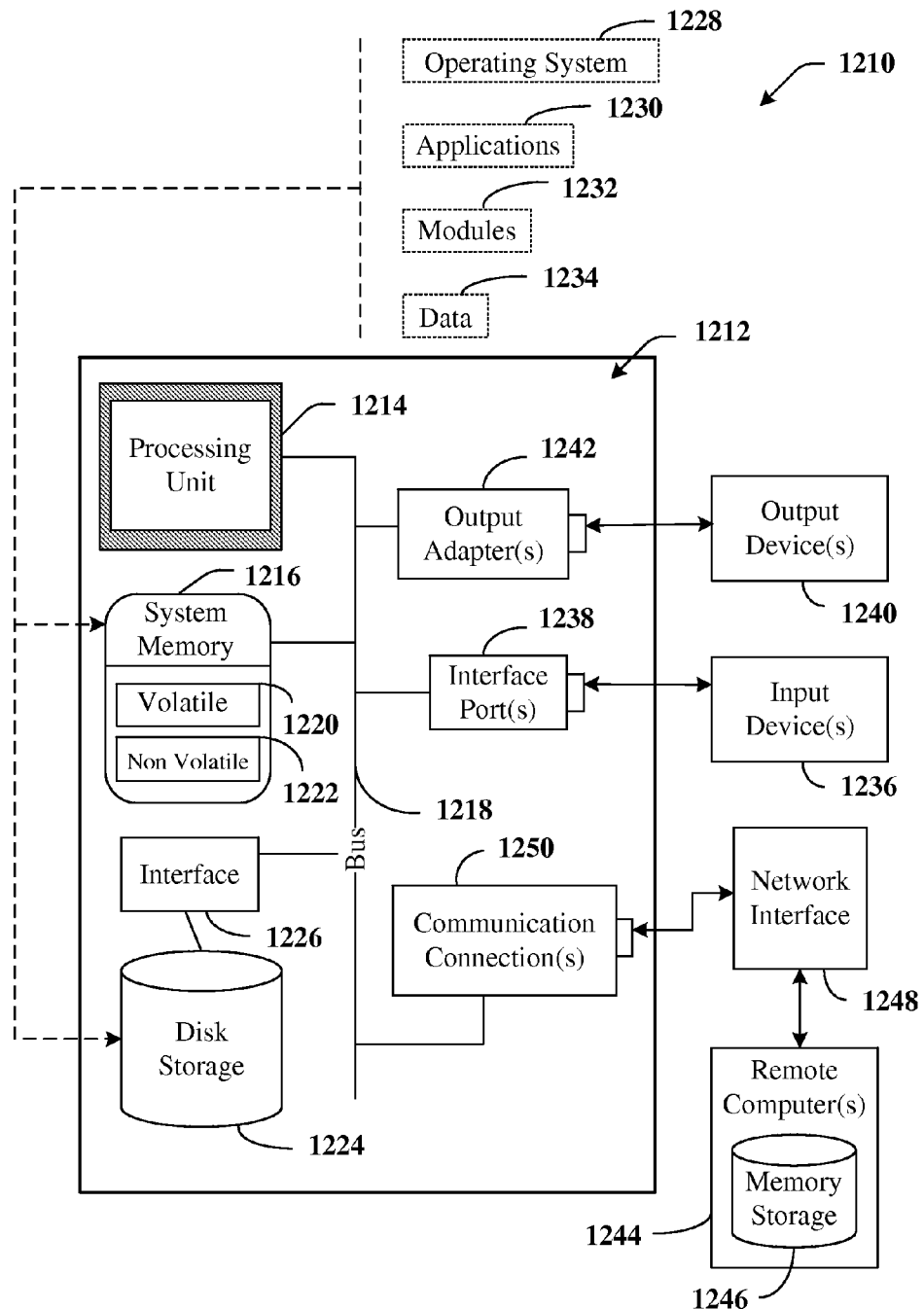
FIG. 12 is an exemplary operating environment that can be employed in connection with the subject invention.

With reference to FIG. 12, an exemplary environment 1210 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/nonvolatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the subject invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

Figure 13:
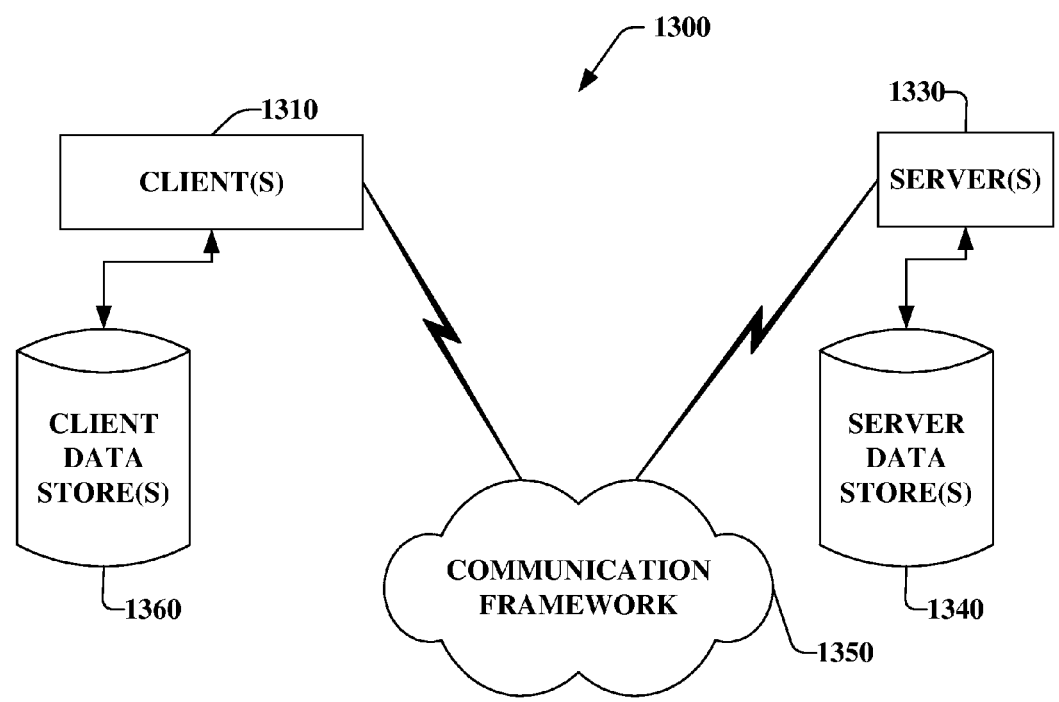
FIG. 13 is an exemplary operating environment that can be employed in connection with the subject invention.

FIG. 13 is a schematic block diagram of a sample-computing environment 1300 with which the subject invention can interact. The system 1300 includes one or more client(s) 1310. The client(s) 1310 can be hardware and/or software (e.g., threads, processes, computing devices). The system 1300 also includes one or more server(s) 1330. The server(s) 1330 can also be hardware and/or software (e.g., threads, processes, computing devices). The servers 1330 can house threads to perform transformations by employing the subject invention, for example. One possible communication between a client 1310 and a server 1330 can be in the form of a data packet adapted to be transmitted between two or more computer processes. The system 1300 includes a communication framework 1350 that can be employed to facilitate communications between the client(s) 1310 and the server(s) 1330. The client(s) 1310 are operably connected to one or more client data store(s) 1360 that can be employed to store information local to the client(s) 1310. Similarly, the server(s) 1330 are operably connected to one or more server data store(s) 1340 that can be employed to store information local to the servers 1330.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A proxy device, comprising:
    a processor;
    a memory communicatively coupled to the processor, the memory having stored thereon executable components configured to implement the proxy device, the proxy device configured to:
        maintain a directory of industrial devices residing on a control and information protocol network and configured to operate in conjunction as a server farm, wherein the proxy device acts as a client to the server farm;
        associate the industrial devices with a namespace;
        receive, from a requesting entity via a global area network, a message that includes a request directed to an industrial device of the industrial devices, wherein the message conforms to a web-based protocol;
        perform a query of the directory based on the request;
        retrieve location information from the directory in response to the query, wherein the location information specifies a location of the industrial device within an industrial system;
        package the request to yield an encapsulated request containing the request, wherein the encapsulated request conforms to a control and information protocol; and
        send the encapsulated request to the industrial device via the control and information network in accordance with the control and information protocol based on the location information.

2. The proxy device of claim 1, wherein the request comprises a request to at least one of read data from or write data to the industrial device.

3. The proxy device of claim 1, wherein the directory stores identification information for the industrial devices and functional information specifying data and functions respectively associated with the industrial devices.

4. The proxy device of claim 1, wherein the message conforms to one or more of eXtensible Markup Language, Simple Object Access Protocol, or HyperText Markup Language.

5. The proxy device of claim 1, wherein the directory provides a look-up service for information stored on the industrial devices.

6. The proxy device of claim 1, wherein the proxy device is further configured to monitor one or more of respective processing capacities or respective memory capacities of the industrial devices.

7. The proxy device of claim 6, wherein the proxy device is further configured to move data from one of the industrial devices to an external data storage device in response to a determination that a memory capacity of the one of the industrial devices is at or near a defined capacity.

8. The proxy device of claim 7, wherein the proxy device is further configured to retrieve time stamp information associated with the data from the one of the industrial devices, and to organize the data on the external data storage device in accordance with the time stamp information.

9. The proxy device of claim 6, wherein the proxy device is further configured to distribute processing tasks among two or more of the industrial devices based on at least one of the respective processing capacities or the respective memory capacities.

10. The proxy device of claim 1, wherein the proxy device is further configured to retrieve data and at least one associated timestamp from the industrial device in accordance with the request.

11. The proxy device of claim 1, wherein the requesting entity comprises an enterprise resource planning system.

12. A method for exchanging data with an automation device, comprising:
    storing, in a proxy device comprising at least one processor, directory information relating to a set of industrial devices configured to operate in conjunction as a server farm on a control and information protocol network, wherein the proxy device acts as a client to the server farm;
    providing a namespace for the set of industrial devices;
    receiving, from a requesting entity via a global area network, a message comprising a request directed to an industrial device of the set of industrial devices, wherein the message conforms to a web-based protocol;
    performing a query of the directory based on the request;
    retrieving location information from the directory information in response to the query, wherein the location information specifies a location of the industrial device within an industrial system;
    packaging the request to yield an encapsulated request that contains the request and is capable of transmission via a control and information protocol; and
    sending the encapsulated request to the industrial device via the control and information protocol network based on the location information.

13. The method of claim 12, wherein the receiving the message comprises receiving the message comprising a request to at least one of read data from or write data to the industrial device.

14. The method of claim 12, wherein the storing the directory information comprises storing identification information for the set of industrial devices and functional information specifying data and functions respectively associated with the set of industrial devices.

15. The method of claim 12, further comprising providing a look-up service for data stored on the set of industrial devices based on the directory information.

16. The method of claim 12, further comprising:
    monitoring, by the proxy device, at least one of respective processing capacities or respective memory capacities of the set of industrial devices; and
    distributing processing tasks among two or more of the set of industrial devices based on at least one of the respective processing capacities or the respective memory capacities.

17. The method of claim 12, further comprising retrieving, by the proxy device, data and a timestamp associated with the data from the industrial device in accordance with the request.

18. The method of claim 12, wherein the receiving comprise receiving the message from an enterprise resource planning system.

19. A non-transitory computer-readable medium having stored thereon executable instructions that, in response to execution, cause a proxy device comprising at least one processor to perform operations, comprising:
    maintaining a directory of industrial devices configured to operate in conjunction as a server farm on a control and information protocol network, wherein the proxy device acts as a client to the server farm;
    associating the industrial devices with a namespace;
    receiving, from a requesting entity via a global area network, a message that includes a request directed to an industrial device of the industrial devices, wherein the message conforms to a web-based protocol;
    initiating a query of the directory based on the request;
    retrieving location information from the directory in response to the query, wherein the location information specifies a location of the industrial device within an industrial system;
    packaging the request to yield an encapsulated request containing the request data and conforming to a control and information protocol; and
    sending the encapsulated request to the industrial device via the control and information protocol network based on the location information.

20. The non-transitory computer-readable medium of claim 19, wherein the maintaining comprises maintaining identification information for the industrial devices and functional data specifying data and functions respectively associated with the industrial devices.

* * * * *